Figure 1:
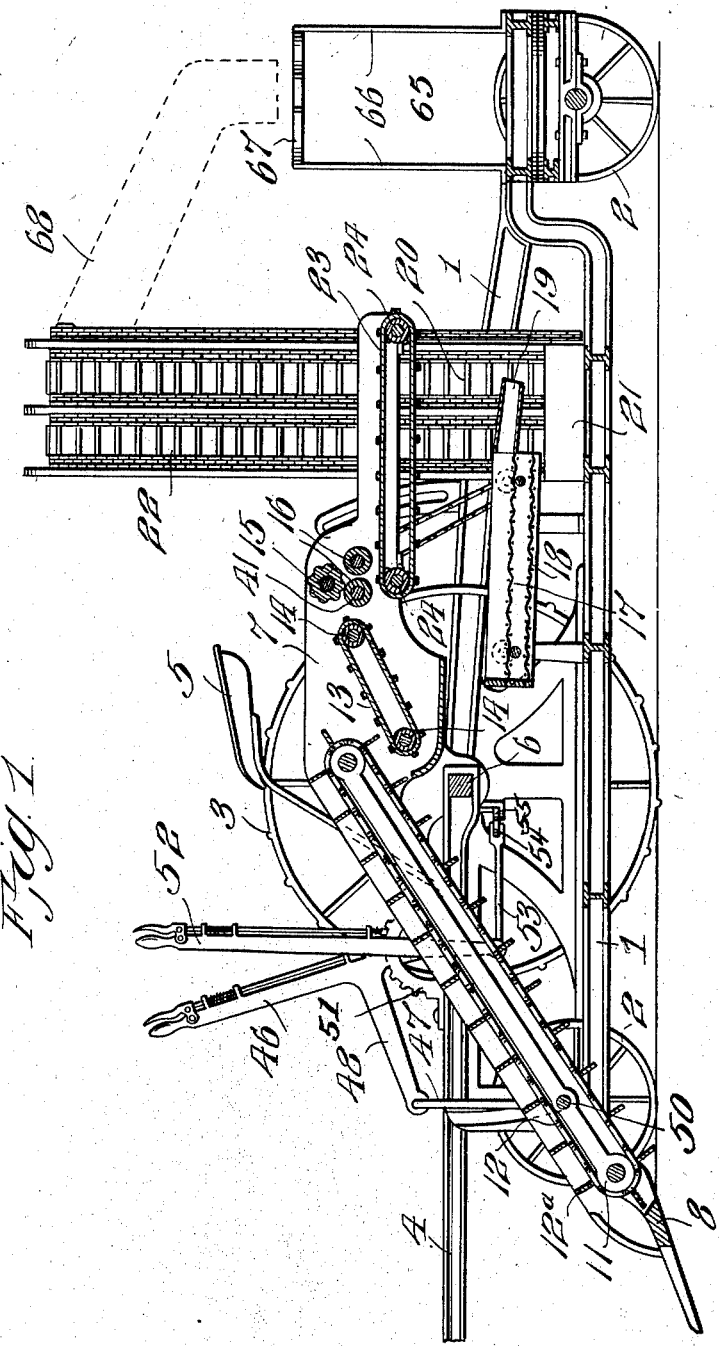

P. A. THOMPSON.
POTATO DIGGER.
APPLICATION FILED JUNE 1, 1909.

965,667.

Patented July 26, 1910.
3 SHEETS—SHEET 1.

Witnesses
Frank Hough

Inventor
Perry A. Thompson,
By Victor J. Evans
Attorney

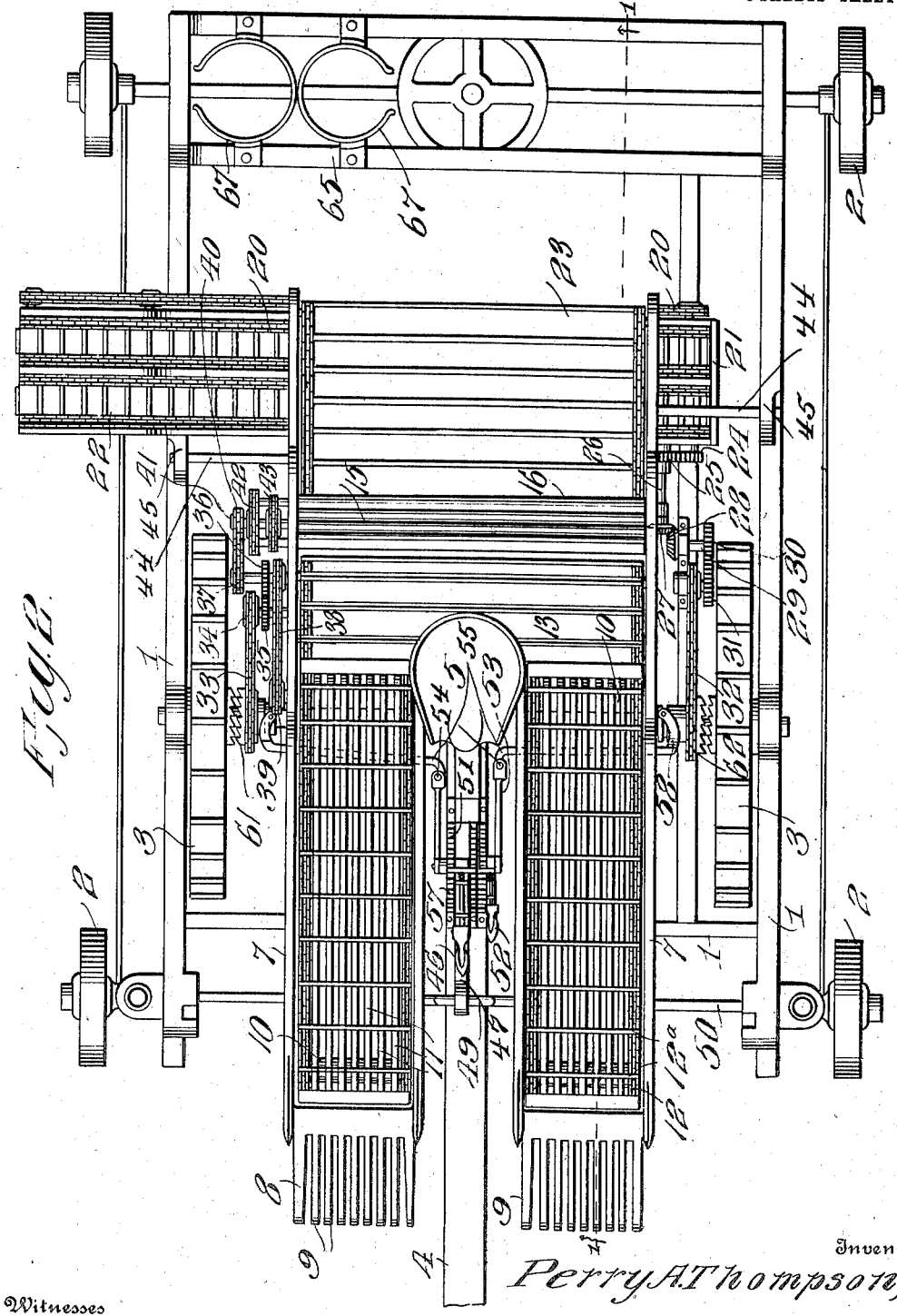

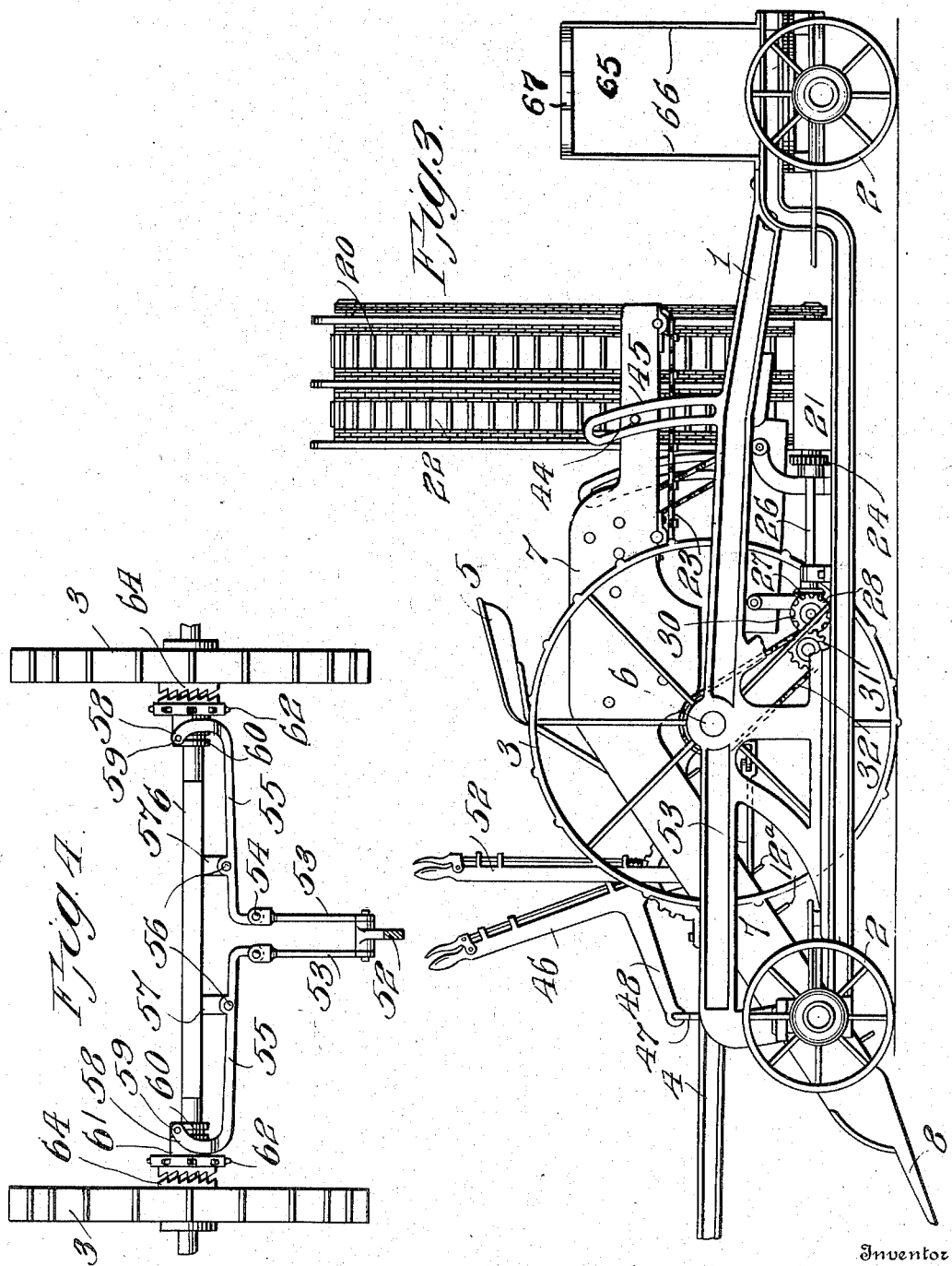

UNITED STATES PATENT OFFICE.

PERRY A. THOMPSON, OF PARMA, COLORADO.

POTATO-DIGGER.

965,667. Specification of Letters Patent. Patented July 26, 1910.

Application filed June 1, 1909. Serial No. 499,312.

*To all whom it may concern:*

Be it known that I, PERRY A. THOMPSON, a citizen of the United States of America, residing at Parma, in the county of Rio Grande and State of Colorado, have invented new and useful Improvements in Potato-Diggers, of which the following is a specification.

This invention relates to potato diggers, and one of the principal objects of the invention is to provide an efficient machine for digging the potatoes, stripping the vines from the same, sorting the potatoes as to size and loading the potatoes into wagons or discharging them into sacks.

Another object of the invention is to provide a machine which will operate upon two rows of potatoes at the same time, carrying the potatoes up and stripping off the vines and permitting the potatoes to drop on to sorting screens from which the potatoes are discharged on to a conveyer which discharges them either into wagons or into sacks supported at the rear of the machine.

Still another object of the invention is to provide reliable and efficient means for raising and lowering the diggers and for controlling the operative mechanism of the machine.

These and other objects may be attained by means of the construction illustrated in the accompanying drawings, in which,—

Figure 1 is a longitudinal section on the line 1—1 of Fig. 2, looking in the direction indicated by the arrows. Fig. 2 is a top plan view of the machine. Fig. 3 is a side elevation of the complete machine. Fig. 4 is a plan view of the ground wheels in which the clutches and clutch-operating mechanism are shown.

Referring to the drawings, the numeral 1 designates a metal frame mounted on front and rear wheels 2 and intermediate drive wheels 3. A tongue or pole 4 is connected to the frame for the attachment of draft animals, and supported upon said pole is a driver's seat 5.

Mounted upon the axle 6 of the wheels 3 upon opposite sides of the pole is a metal frame 7, and formed on or connected to the front end of each of these frames is a digger member 8 comprising a series of fingers or tines 9 properly spaced apart and designed for the purpose of passing under the row of potatoes and lifting the same and carrying it up to a point where it will be discharged upon an elevator belt. There being two digger members of identical construction a description of one will serve for both.
Mounted to travel upon the rollers 10 journaled at the ends of bearing bars 11 is an endless conveyer 12 provided with flights or partitions 12ª, said conveyer adapted to take potatoes from the digger members 8 and convey them up and discharge them upon a belt 13 traveling over rollers 14 journaled in the frame 7. The belt 13 carries the potatoes backward, and the vines are grasped between the corrugated roller 15 and the two plain rollers 16 and stripped from the potatoes, the latter dropping through between the belt and rollers on to a sorter screen 17, said screen being of large mesh so that the smaller potatoes will drop through upon another screen 18. The potatoes are discharged from the screens 17 into a spout 19 which discharges upon an endless conveyer belt 20, while the smaller potatoes dropping upon the screen 18 are discharged into a compartment 21, from which the potatoes are taken up by the conveyer 22 and discharged. The vines are carried back by means of a belt 23 mounted upon rollers 24 and discharged at the rear of the machine. The conveyers 20 and 22 are mounted on upper and lower rollers, said lower roller being actuated by means of a gear wheel 24 adapted to mesh with a similar gear 25 on a shaft 26 journaled at the side of the frame 7, said shaft 26 carrying a bevel pinion 27 meshing with a similar pinion 28 on the stub shaft 29 journaled in the frame and provided with a gear wheel 30 on its outer end, said gear wheel meshing with a similar gear 31 mounted on a shaft upon which a sprocket wheel is mounted. A drive chain 32 extends around said sprocket wheel and around the sprocket wheel on the shaft 6.

Upon the opposite side of the machine a sprocket chain 33 passes over a sprocket wheel on the shaft 6 and around a similar sprocket mounted upon a stub shaft 34 carrying a gear wheel 35 which meshes with a gear 36 on a shaft 37. The shaft 37 carries a sprocket wheel near its inner end upon which a chain 38 is carried, said chain passing over a sprocket wheel 39 on a stub shaft mounted in the frame. For operating the rollers 15 and 16 a drive chain 40 passes around a sprocket wheel on the shaft 37 and over a sprocket wheel on a shaft 41, said shaft bearing on the roller 16. Drive chains 42 and 43 pass over sprocket wheels to operate the rollers 15 and 16.

The frames 7 near their rear ends are provided with outwardly projecting studs 44, and the frame 1 is provided with a curved and slotted guide 45 through which the stud 44 projects. The frame 7 may be tilted or raised and lowered at its front end by means of a lever 46, said lever having a link 47 connected to its angular arm 48, said link being connected at its lower end to a cranked portion 49 of a shaft 50 journaled in the frame 7. The lever 46 is provided with a rack 51, and when the driver moves the lever back toward the seat 5, the digger members are raised from the ground. The opposite movement of the lever depresses the diggers.

A lever 52 pivoted to the frame 7 has connected to its lower end a pair of links 53, said links being pivotally connected at 54 to the clutch-operating levers 55, said levers 55 being pivoted at 56 upon lugs 57 formed upon the axle 6 of the operating wheels 3. The clutch-operating levers 55 have curved forked ends 58 provided with studs 59 which engage the grooves 60 in the clutch members 61. The clutch members 61 carry sprocket wheels 62 around which the chains 32 and 33 pass. On the hubs of the wheels 3 the clutch members 64 are formed. Thus, by moving the lever 52 toward the rear, the clutch members 61 are withdrawn from the clutch members 64, and the machine is thrown out of operation.

Mounted upon the rear extension of the frame 1 are the sack holders 65 comprising uprights 66 connected to the spring-holding rings 67. A suitable discharge spout 68, shown in dotted lines in Fig. 1, is designed to take the potatoes from the conveyers 20, 22, and discharge them into bags or sacks held by the springs 7.

The operation of the machine may be briefly described as follows: As the machine is moved along the digger members 8 uproot the potatoes and carry them, vines and roots, upon the conveyer 12 from which they are discharged upon the belt 13 and carried back to the rollers 15 and 16 which grasp the vines and strip them from the potatoes, the latter falling upon the screen 17 through which the smaller ones drop upon the screen 18. The potatoes from the screen 17 are discharged through the spout 19 upon the conveyer 20, while the potatoes from the screen 18 are deposited in a receptacle 21 and carried up upon the belt 22. These potatoes may be discharged either into a wagon or into the sacks held in place by the springs 67.

From the foregoing, it will be obvious that the machine may be made to operate upon one row of potatoes or two, as shown, and that the conveyers 20 and 22 may be arranged to discharge upon opposite sides of the machine, if so desired. The machine is comparatively simple in construction, considering the number and efficiency of the operations to be performed.

I claim:—

1. In a potato digger, the combination with a wheeled frame, digging forks and a potato conveyer; of a vine stripper including plain and corrugated rollers journaled in the frame, an auxiliary conveyer located between the stripper and first-named conveyer and serving to direct the vines to the stripper, a vine conveyer located below the stripper, a plain roller located adjacent the plain roller of the stripper and serving to direct the vines passing between the rollers of the stripper on to the vine conveyer, and connections between the conveyers and stripper and wheels of the frame for actuating the said conveyers and stripper.

2. In a potato digger, the combination with a wheeled main frame, digging forks, and a potato conveyer; of a frame pivoted to the main frame and supporting the said digging forks and potato conveyer, a vine stripper including a pair of rollers one of which is corrugated and the other plain and bearing one upon the other and journaled in the pivoted frame, an auxiliary conveyer located between the stripper and first-mentioned conveyer and serving to direct the vines to the stripper, a vine conveyer located below the stripper and extending in advance of the latter, a plain roller located adjacent the plain roller of the stripper and serving to direct the vines passing between the rollers of the stripper on to the vine conveyer and connections between the conveyers and stripper and wheels of the frame for actuating the said conveyers and stripper.

In testimony whereof I affix my signature in presence of two witnesses.

PERRY A. THOMPSON.

Witnesses:
FRANK E. MOODY,
JOHN N. KERR.